(12) United States Patent
King

(10) Patent No.: US 9,661,137 B2
(45) Date of Patent: May 23, 2017

(54) SYSTEM AND METHOD FOR AUTOMATIC COMMUNICATION DISTRIBUTION LOCAL ASSIGNMENT

(71) Applicant: Interactive Intelligence Group, Inc., Indianapolis, IN (US)

(72) Inventor: Kevin Elliott King, Bargersville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 14/961,320

(22) Filed: Dec. 7, 2015

(65) Prior Publication Data

US 2016/0165049 A1    Jun. 9, 2016

Related U.S. Application Data

(60) Provisional application No. 62/088,992, filed on Dec. 8, 2014.

(51) Int. Cl.

| | | |
|---|---|---|
| *H04M 1/24* | (2006.01) | |
| *H04M 3/08* | (2006.01) | |
| *H04M 3/22* | (2006.01) | |
| *H04M 3/00* | (2006.01) | |
| *H04M 5/00* | (2006.01) | |
| *H04M 3/51* | (2006.01) | |
| *H04M 3/28* | (2006.01) | |

(Continued)

(52) U.S. Cl.
CPC ............ *H04M 3/5183* (2013.01); *H04M 3/12* (2013.01); *H04M 3/28* (2013.01); *H04M 3/5238* (2013.01); *H04M 3/5237* (2013.01)

(58) Field of Classification Search
CPC ..... H04L 45/22; H04L 45/28; H04L 65/1006; H04M 3/523; H04M 3/5237; H04M 2203/408; H04M 3/5125; H04M 3/5166; H04M 3/5191; H04M 3/5231; H04M 7/0063; G06F 9/5072
USPC ........... 379/1.01, 9, 14.01, 10.01, 15.01, 22, 379/32.01, 265.01, 265.02, 265.04, 379/265.08, 265.09, 265.1, 266.01, 379/266.06, 309, 14, 265.11; 370/352–360
See application file for complete search history.

(56) References Cited

U.S. PATENT DOCUMENTS

| | | | |
|---|---|---|---|
| 2006/0165066 A1* | 7/2006 | Campbell ........... | H04M 3/5125 370/352 |
| 2008/0123839 A1* | 5/2008 | McCormack ......... | H04M 3/523 379/265.02 |

(Continued)

*Primary Examiner* — Binh Tieu
(74) *Attorney, Agent, or Firm* — Ice Miller LLP

(57) ABSTRACT

A system and method are presented for automatic communication distribution local assignment. An on-premises device, in a contact center environment using a cloud-based solution, communicates with the solution to determine if there is a service interruption. When an interruption is determined, the on-premises device steps in to perform local assignment of communications for the solution until communication has been restored with the cloud-based solution. The on-premises device comprises a module that monitors all ACD communication flows. The module may also manage the logic of when to intervene and how to assign communications in queue to available agents during outages.

25 Claims, 3 Drawing Sheets

(51) Int. Cl.
*H04M 3/12* (2006.01)
*H04M 3/523* (2006.01)

(56) References Cited

U.S. PATENT DOCUMENTS

| | | | |
|---|---|---|---|
| 2013/0129075 A1* | 5/2013 | Whitaker | H04M 3/523 379/265.09 |
| 2014/0082179 A1* | 3/2014 | Steiner | G06Q 10/0631 709/224 |
| 2014/0226810 A1* | 8/2014 | Steiner | H04M 3/5233 379/265.12 |
| 2014/0269258 A1* | 9/2014 | Bischoff | H04L 45/28 370/221 |
| 2015/0023490 A1* | 1/2015 | Jay | H04M 3/5125 379/265.12 |
| 2015/0161661 A1* | 6/2015 | Granville | G06Q 30/02 705/14.45 |
| 2015/0189074 A1* | 7/2015 | Lum | H04L 65/1006 379/380 |
| 2016/0100033 A1* | 4/2016 | Kridlo | H04L 67/06 709/203 |

* cited by examiner

SYSTEM AND METHOD FOR AUTOMATIC COMMUNICATION DISTRIBUTION LOCAL ASSIGNMENT

CROSS-REFERENCE TO RELATED APPLICATIONS

This application claims priority to U.S. provisional application 62/088,992 filed Dec. 8, 2014, entitled "System and Method for Automatic Communication Distribution Local Assignment", the contents of which are incorporated herein.

BACKGROUND

The present invention generally relates to telecommunications systems and methods, as well as communication routing. More particularly, the present invention pertains to the interaction between on-premises devices and cloud-based services.

SUMMARY

A system and method are presented for automatic communication distribution local assignment. An on-premises device, in a contact center environment using a cloud-based solution, communicates with the solution to determine if there is a service interruption. When an interruption is determined, the on-premises device steps in to perform local assignment of communications for the solution until communication has been restored with the cloud-based solution. The on-premises device comprises a module that monitors all ACD communication flows. The module may also manage the logic of when to intervene and how to assign communications in queue to available agents during outages.

In one embodiment, a method is presented for routing communications in a contact center environment, wherein the environment comprises a cloud-based solution which hosts an assignment service and an on-premises device which is capable of communicating with the cloud-based solution, wherein the method comprises: (a) receiving at least one communication in a wait queue, wherein the at least one communication undergoes initial processing by the assignment service; (b) determining, by the assignment service, if at least one agent is available to handle communications wherein, if an agent is available, proceeding to the next step, and if an agent is not available, re-assigning an assignment timer and repeating step (b); (c) communicating via a communication path, by the on-premises device, with the assignment service to determine if there is a communication path failure, wherein, if the communication path failure is detected by the on-premises device, the on-premises device triggers a local assignment process on the device; and if the communication path failure is not detected by the on-premises device, taking no additional action by the on-premises device until a communication path failure is detected, (d) after the detection of communication path failure, determining, by the on-premises device, a number of agents available to route the at least one communication to; (e) transferring the at least one communication, by the on-premises device, to available agents; and (f) determining if the wait queue is empty, by the on-premises device, wherein: if the wait queue is empty, taking no further action by the on-premises device; and if the wait queue is not empty, continuing the process from step (a) until an event occurs.

In another embodiment, a method is presented for routing communications in a contact center environment, wherein the environment comprises a cloud-based solution which hosts an assignment service and an on-premises device which is capable of communicating with the cloud-based solution, where the communication between the on-premises device and the cloud-based solution is disrupted, wherein the method comprises: determining, by the on-premises device, a number of agents available in which to route waiting communications; transferring waiting communications, by the on-premises device, to available agents; and yielding, by the on-premises device, to the cloud-based solution when an event occurs.

DETAILED DESCRIPTION

Figure 1:
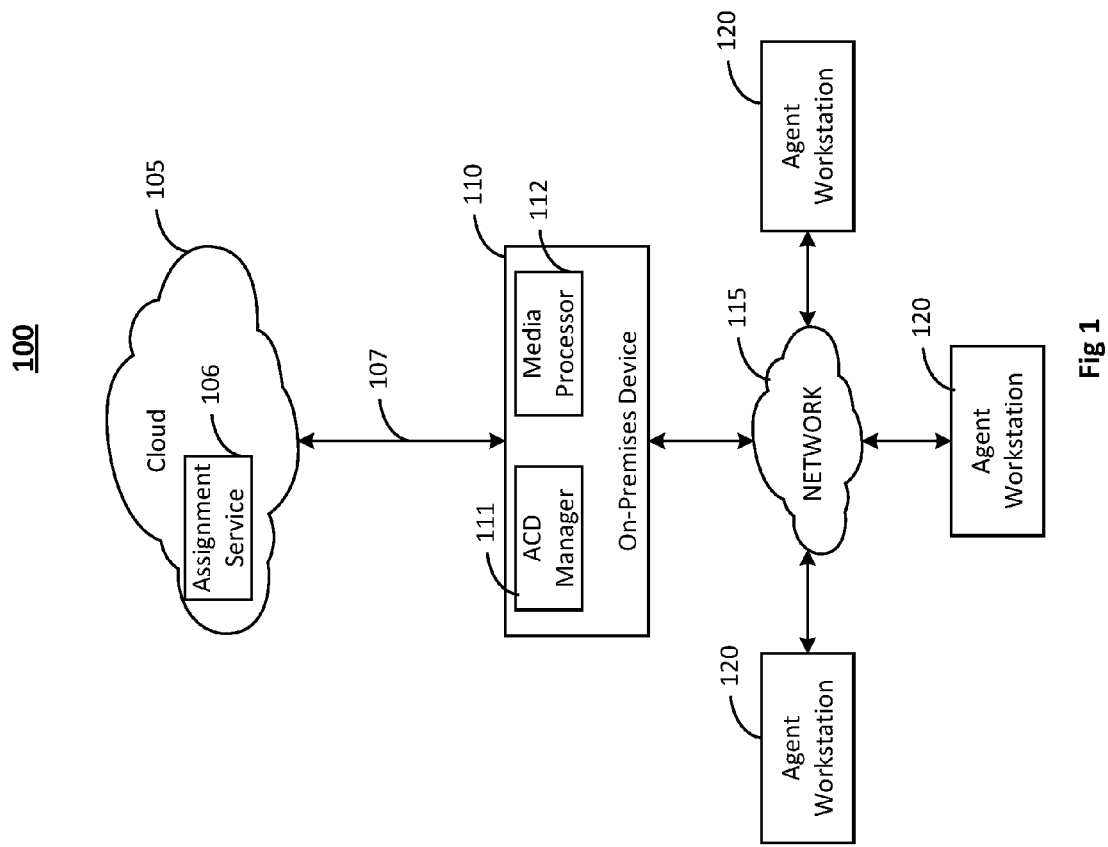
FIG. 1 is a diagram illustrating an embodiment of a system for ACD assignment.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic Communication Distribution (ACD) has been typically performed on premises in a contact center environment. With the advent of cloud-based computing, ACD processing is being moved off premises and into the cloud. ACD processing for a cloud related product is usually performed completely in the cloud, where the cloud related product can perform sophisticated matching, such as on skills with routing of communications. Problems arise though in the disruption of cloud service. When this happens, the contact center shuts down and cannot perform. Communications become abandoned.

A device may be placed on premises, such as Interactive Intelligence Group, Inc.'s PureCloud Edge. The device may merely monitor the cloud service's activity where the cloud service is assigning and transferring communications under normal conditions. In an embodiment, the device only performs local ACD routing when it determines there has been a disruption of the cloud service. There may still be communications waiting in queue and available active agents. The device queries the cloud service prior to locally routing the communications to determine if the criteria are there for local routing. When the device transfers communications to agent stations, the device does so in a non-intrusive way while continuously checking to see if the cloud service has resumed operations. If the device determines that the cloud service has resumed operations, then the device yields to the cloud.

By tracking the cloud ACD activity, the device is able to step in and provide a basic ACD service when needed, such as during a communication disruption between the contact center and the cloud service. This provides the entire solution and business a more robust ability to survive during different types of outages. By not making the transition from cloud service to device a state transition, the device is able to temporarily take control during disruptions that might occur, such as over a poor Internet connection, failures of infrastructure, partial failures of the cloud service, etc., to name a few non-limiting examples. The transition from cloud to premises occurs seamlessly, such that a communication is not even aware of a disruption within the system.

FIG. 1 is a diagram illustrating an embodiment of a system for ACD assignment, indicated generally at 100. The parts of the system may comprise a device on premises 110, capable of communication with the cloud 105, and agent workstations 120 connected through a network 115 with the on-premises device 110. The cloud 105 may host an assignment service 106. The assignment service 106 may handle the routing of communications within a contact center environment. The on-premises device 110 communicates 107 with the cloud 105 and comprises capability 111 to locally manage the ACD assignment until the cloud resumes communication with the device. The on-premises device 110 may also comprise a media processor 112 which handles processes such as IVR and in-queue processing of media. Local assignment may be performed through an ACD management capability 111 on the device 110 that monitors ACD communication flows. The manager 111 may also manage the logic of when to intervene and how to assign communications in queue to available agents at agent stations 120, among other functions. In a contact center environment, communications flow through the on-premises device 110 to an agent workstation via a network 115. An agent workstation 120 may comprise a workstation computer coupled to a display. Workstation computers may be of the same type, or a heterogeneous combination of different computing devices. Likewise, displays may be of the same type or a heterogeneous combination of different visual devices. It should be understood that while three work stations are described in the illustrative embodiment, more may be utilized. Contact center applications of system 100 typically include many more workstations of this type at one or more physical locations, but only a few are illustrated in FIG. 1 to preserve clarity.

A digital telephone may be associated with an agent workstation 120. The digital telephone may be integrated into the agent computer and/or implemented in software. It should be understood that a digital telephone, which is capable of being directly connected to network 115, may be in the form of handset, headset, or other arrangement as would occur to those skilled in the art. The agent workstations 120 may be connected through a computer network 115 to the on-premises device 110.

Figure 2:
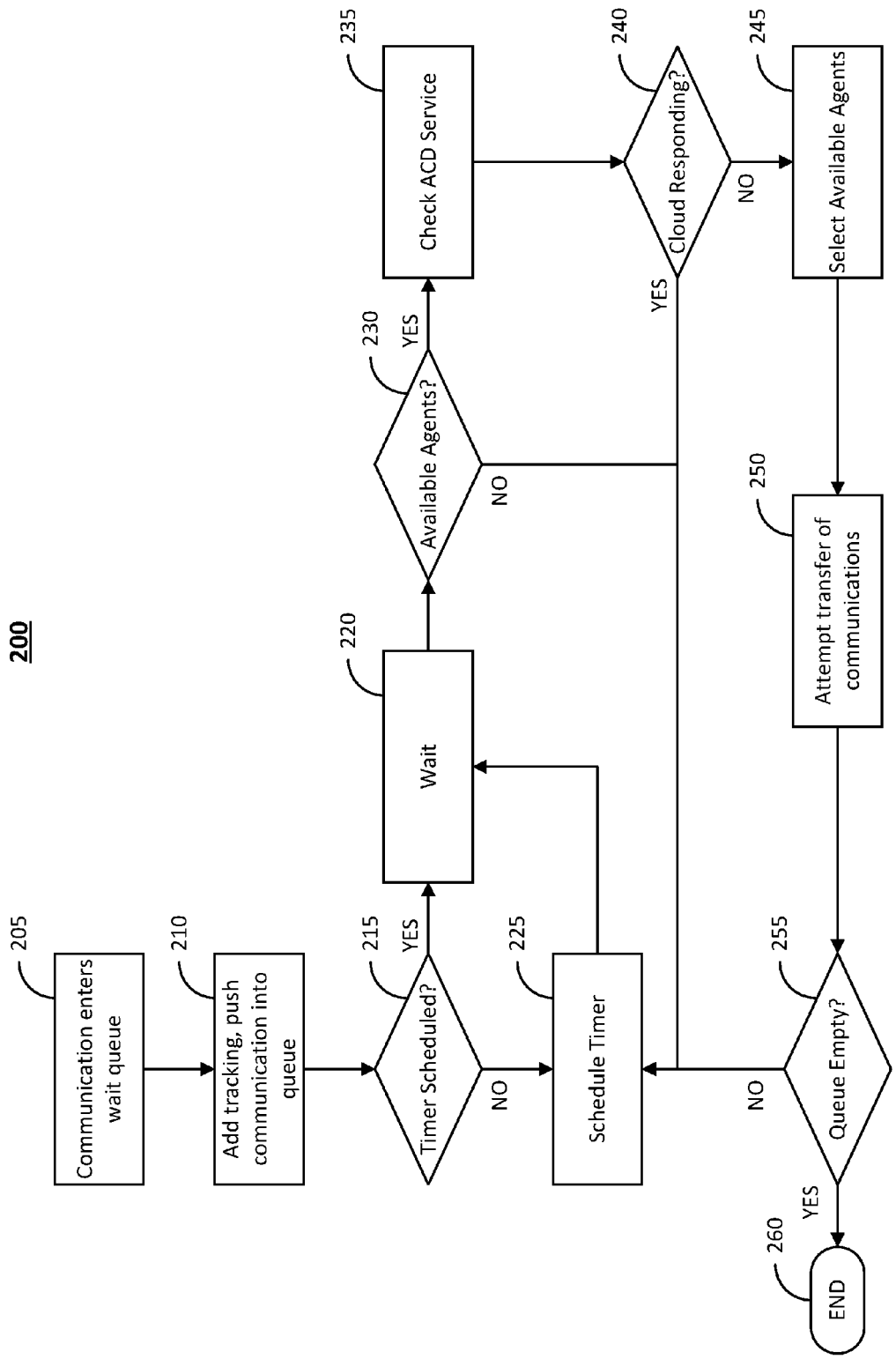
FIG. 2 is a flowchart illustrating a process for ACD local assignment.

FIG. 2 is a flowchart illustrating a process for ACD local assignment, indicated generally at 200. The process in FIG. 2 may occur in the on-premises device 110 shown in FIG. 1. In an embodiment, there is no special state of the process 200, apart from what occurs if the ACD assignment service within the cloud is issuing the assignments and transfers. The cloud service is able to take responsibility back from the on-premises device for assignments when communication is restored after an outage. Thus, the local tracking queue does not need to be altered as a result of the outage.

In operation 205, a communication is determined to have entered the wait queue. For example, a communication may comprise a call that is in-coming to a contact center system and has been routed into the wait queue. Control is passed to operation 210 and process 200 continues.

In operation 210, a tracking mechanism is added. For example, ordering may be done in a first-in-first-out manner (FIFO), or another desired ordering, such as by communication priority. In an embodiment, communications transferred into ACD queues are tracked in order to discriminate them from non-ACD communications, which are not processed. Control is passed to operation 215 and process 200 continues.

In operation 215, it is determined whether or not an assignment timer has been scheduled. If it is determined that an assignment timer has been scheduled, control is passed to operation 220 and the process continues. If it is determined that an assignment timer has not been scheduled, control is passed to operation 225 and the process continues.

The determination in operation 215 may be made in any suitable manner. In an embodiment, a timer may be started when a queue status is non-empty. Where there are no ACD communications in the system, a timer may not be initiated. The amount of time the timer is scheduled for may be set to any desired amount of time, such as 30 seconds, to name a non-limiting example.

In operation 220, the process waits until the assignment timer completes. For example, the assignment timer reaches its determined endpoint, such as the passing of a pre-determined amount of time, for example. Control is passed to operation 230 and process 200 continues.

In operation 225, an assignment timer is scheduled. In an embodiment, if this is not the first time an assignment timer is scheduled for a particular communication, a shorter assignment timer may be scheduled. The length of the time may comprise any pre-determined time interval, such as 30 seconds to name a non-limiting example, and may be tuned depending on the desires of the user. In an embodiment, a communication may have multiple successive timers assigned to it through the course of the process 200 until it is handled. Control is passed to operation 220 and process 200 continues.

In operation 230, it is determined whether or not agents are available. If it is determined that agents are available, control is passed to operation 235 and the process continues. If it is determined that agents are not available, control is passed back to operation 225 and the process continues.

The determination in operation 230 may be made by any suitable means. For example, the system may determine that there are agents logged in to their work stations with active statuses in the contact center management application.

In operation 235, a check of the ACD service is performed. In an embodiment, the on-premises device may wait for a response from the cloud ACD service for a designated amount of time. In a non-limiting example, the device may wait for up to one minute for a response from the Could ACD service. In another embodiment, a round trip request to the assignment service may be performed to see if the assignment service is fully functional. The assignment service could have partial functionality where certain components are not functioning. Control is passed to operation 240 and process 200 continues.

In operation 240, it is determined whether or not the cloud service is responding. If it is determined that the cloud is responding, control is passed back to operation 225 and the process continues. If it is determined that the cloud is not responding, control is passed to operation 245 and the process continues.

The determination in operation 240 may be accomplished through the on-premises device querying the cloud. In an embodiment, to check the cloud, the on-premises device may use the same restful communication paths as normal cloud responses would travel. Any caches with a max-age=0 and max-state=0 may be by-passed. A timeout and some error responses may be considered failures and trigger the local assignment function of the on-premises device. A successful response by the cloud that it is processing requests may be considered a "success" and the on-premises device takes no action on the communications.

When the on-premises device confirms proper communication with the cloud and that it is working properly, the on-premises device will not intervene and continue to wait for the cloud assignment service to perform its function. In an embodiment, when the device determines that the assignment service is not properly functioning, the device takes control until criteria are met. Examples of criteria may include: no more communications left in the queue, the cloud begins to function again, etc. Emptying of the queue may occur for a number of reasons, such as assignments from the device, cloud, call disconnects, or transfers to other endpoints. The system may be tolerant of communications leaving the queue for any reason.

In operation 245, the on-premises device selects a designated number of agents. In an embodiment, the designated number of agents may comprise a threshold number of the longest available agents associated with the contact center. The threshold number of agents may be pre-determined, such that perhaps the ten longest available agents are selected. The order in which they are selected may be shuffled to avoid assigning the same communications to the same agents to pre-empt situations where stations are abandoned or agents are not answering the communications. This may also prevent the longest waiting communication from being assigned to the station that has been abandoned the longest. Control is passed to operation 250 and process 200 continues.

In operation 250, transfer is attempted of the communication. For example, the device may attempt to transfer the longest waiting communications to the selected agents from operation 240. In an embodiment, transfers may comprise regularly attended transfers that occur in the same manner as if the transfer was issued by the cloud (as opposed to the on-premises device). In an embodiment, attended transfer allows the communicant to continue hearing wait announcements, hold-music, or other information, while waiting for an agent while the agent is alerted to handle the transferred communication. Control is passed to operation 255 and process 200 continues.

In operation 255, it is determined whether or not the communication queue is empty. If it is determined that the queue is empty, control is passed to operation 260 and the process 200 ends. If it is determined that the queue is not empty, control is passed back to operation 225 and the process 200 continues.

Figure 3:
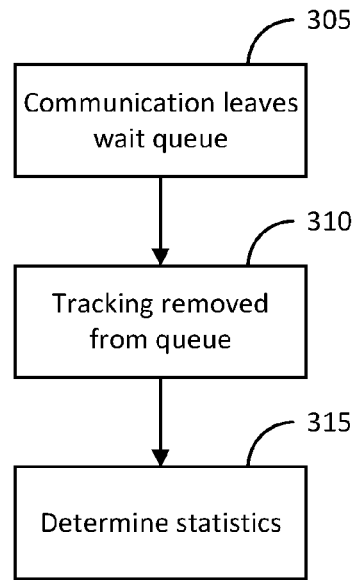
FIG. 3 is a flowchart illustrating a process for ACD local assignment.

Successfully transferred communications may undergo further processing as described in FIG. 3. FIG. 3 is a flowchart illustrating a process for ACD local assignment, indicated generally at 300. More specifically, the process 300 describes processing for successfully transferred communications by the on-premises device. In an embodiment, the process 300 occurs after a communication is successfully transferred to an agent.

In operation 305, the communication leaves the ACD wait queue. For example, the communication may be transferred through system processing to an available agent. Control is passed to operation 310 and the process 300 continues.

In operation 310, tracking is removed from the queue. For example, the communication has been successfully transferred and is thus removed from the queue of communications. As a result, tracking is no longer necessary. Control is passed to operation 315 and the process 300 continues.

In operation 315, statistics are determined and the process ends. For example, statistics relevant to that particular contact center system may be determined such as those commonly known in the art (e.g., abandon rate, time in queue, etc.) for tracking and reporting purposes. In an embodiment, these statistics may be stored in the cloud service and may be determined through means such as the on premises device, forecasting software connected to the system, etc.

The process between the on-premises device assignment and the remote cloud assignment is capable of transitioning back and forth without noticeable interruption. In an embodiment, the process is tolerant of intermittent Internet connectivity as well as other problems, such as DNS resolution failures, customer LAN network failures, cloud service failures, etc., without abandoning communications. In an example, the process may be tolerant of internal cloud service failures. Assignment service code may be present in the cloud service in addition to the platform services provided (e.g., Kafka, MongoDB, etc.) by the cloud service. In a non-limiting example, MongoDB fails, but the internet connection and assignment service continue to work. This may not be found by a simple query, but by a round trip request to the assignment service, which is capable of checking the health of the service's dependencies.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for routing communications in a contact center environment, wherein the environment comprises a cloud-based solution which hosts an assignment service and an on-premises device which is capable of communicating with the cloud-based solution, wherein the method comprises:
   a. receiving at least one communication in a wait queue, wherein the at least one communication undergoes initial processing by the assignment service, wherein the assignment service is hosted by the cloud-based solution;
   b. determining, by the assignment service, if at least one agent is available to handle communications wherein,
      i. if an agent is available, proceeding to the next step, and
      ii. if an agent is not available, re-assigning an assignment timer and repeating step (b);
   c. communicating via a communication path, by the on-premises device, with the assignment service to determine if there is a communication path failure, wherein,
      i. if the communication path failure is detected by the on-premises device, the on-premises device triggers a local assignment process on the device; and
      ii. if the communication path failure is not detected by the on-premises device, taking no additional action by the on-premises device until a communication path failure is detected, d. after the detection of communication path failure, determining, by the on-premises device, a number of agents available to route the at least one communication to;
e. transferring the at least one communication, by the on-premises device, to available agents; and
f. determining if the wait queue is empty, by the on-premises device, wherein:
 i. if the wait queue is empty, taking no further action by the on-premises device; and
 ii. if the wait queue is not empty, continuing the process from step (a) until an event occurs.

2. The method of claim 1, wherein the initial processing comprises one or more of: adding tracking to each communication and scheduling an assignment timer for each communication.

3. The method of claim 1, wherein the re-assigned assignment timer is shorter than the previous assignment timer.

4. The method of claim 1, wherein the re-assigned assignment timer is shorter than the initially assigned assignment timer.

5. The method of claim 1, wherein the communication path comprises the same path which normal cloud service responses travel.

6. The method of claim 1, wherein the communication comprises a query.

7. The method of claim 1, wherein the trigger comprises a timeout.

8. The method of claim 1, wherein the trigger comprises an error response.

9. The method of claim 1, wherein the determination of number of agents available comprises a threshold number of longest available agents associated with the contact center.

10. The method of claim 1, wherein the transfer of the at least one communication comprises transferring longest waiting communications soonest to longest waiting agents.

11. The method of claim 10, wherein longest waiting agent order is shuffled with each round of transfers.

12. The method of claim 1, wherein the event comprises the cloud-based solution responding to communication from the on-premises device.

13. The method of claim 1, wherein the event comprises all communications in queue being drained.

14. The method of claim 13 wherein draining comprises one or more of the following: on-premises device assignment, cloud-based solution assignment, communication disconnection, transfer of a communication to other system parts, and transfer of a communication to an external endpoint.

15. The method of claim 1, wherein the on-premises device comprises capability to provide local automatic communication distribution routing.

16. The method of claim 15, wherein the on-premises device continuously communicates with the cloud-based solution for resumption of operations, wherein the on-premises device yields to the cloud-based solution on resumption of operations.

17. The method of claim 15, wherein the capability further comprises monitoring communication flows.

18. The method of claim 15, wherein the capability further comprises managing logic.

19. The method of claim 18, wherein the logic comprises one or more of: intervention timing by the on-premises device and communication assignment routing knowledge.

20. A method for routing communications in a contact center environment, wherein the environment comprises a cloud-based solution which hosts an assignment service and an on-premises device which is capable of communicating with the cloud-based solution, where the communication between the on-premises device and the cloud-based solution is disrupted, wherein the method comprises:
a. determining, by the on-premises device, a number of agents available in which to route waiting communications;
b. transferring waiting communications, by the on-premises device, to available agents; and
c. yielding, by the on-premises device, to the cloud-based solution when an event occurs.

21. The method of claim 20, wherein the determination of number of agents available comprises a threshold number of longest available agents associated with the contact center.

22. The method of claim 20, wherein the transfer comprises transferring longest waiting communications soonest to longest waiting available agents.

23. The method of claim 20, wherein the event comprises at least one of: queue drain and the cloud-based solution responding to communication from the on-premises device.

24. The method of claim 23, wherein queue drain comprises diminishing a number of communications waiting in the queue.

25. The method of claim 24, wherein the number of communications are diminished by at least one of: on-premises device assignment, cloud-based solution assignment, communication disconnection, transfer of a communication to other system parts, and transfer of a communication to an external endpoint.

* * * * *